3,329,569
HYPOTENSIVE COMPOSITIONS AND METHODS OF PRODUCING HYPOTENSION

Ralph E. Tedeschi, Cherry Hill, N.J., and Joseph Weinstock, Phoenixville, Pa., assignors to Smith Kline & French Laboratories, Philadelphia, Pa., a corporation of Pennsylvania
No Drawing. Filed June 12, 1964, Ser. No. 374,821
10 Claims. (Cl. 167—65)

This application is a continuation-in-part of application Ser. No. 213,576 filed July 31, 1962, now abandoned.

This invention relates to 2,6-diamino-4-substituted-pyridines and corresponding N-oxides thereof having hypotensive activity and to methods of producing hypotension.

More specifically this invention relates to pharmaceutical compositions, in dosage unit form, comprising a 2,6-diamino-4-substituted-pyridine or a corresponding N-oxide thereof and a nontoxic pharmaceutical carrier. The 2,6-diamino-4-substituted-pyridines have the following general structural formula:

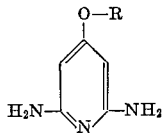

*Formula I* in which R represents lower alkyl of from 3 to 8 carbon atoms, straight or branched, phenyl or substituted phenyl, for example substituted by one or more lower alkyl, lower alkoxy, halogen or trifluoromethyl groups. The lower alkyl and lower alkoxy phenyl substituents are preferably of from 1 to 3 carbon atoms and the halogen group is chloro, bromo or fluoro. The corresponding N-oxides of Formula I have the usual pyridine-N-oxide formula.

The non-toxic pharmaceutically acceptable acid addition salts of the 2,6-diamino-4-substituted-pyridines of Formula I and N-oxides thereof are also included within the scope of this invention since such salts likewise have hypotensive activity. Both organic and inorganic acids can be employed to form pharmaceutically acceptable salts, illustrative acids being sulfuric, nitric, phosphoric, citric, acetic, lactic, tartaric, ethanedisulfonic, sulfamic, succinic, fumaric, maleic, hydrochloric, hydrobromic, benzoic and the like. These salts are prepared by methods known to the art.

The hypotensive activity of the 2,6-diamino-4-substituted-pyridines of Formula I and N-oxides thereof is demonstrated by animal experimentation. Thus administration of the compound to dogs produces a significant drop in blood pressure which is of long duration. Of particular interest is the lowering of the blood pressure of renal and neurogenic hypertensive dogs to a greater degree than of the normotensive dog.

An advantageous compound of this invention is 4-(n-butoxy)-2,6-diaminopyridine.

The 2,6-diamino-4-substituted-pyridines of Formula I and corresponding N-oxides thereof are advantageously employed in pharmaceutical compositions containing an amount of the compound sufficient to produce hypotension. The compositions preferably contain from about 10 mg. to about 250 mg. of the pyridine compound, advantageously from about 10 mg. to about 150 mg. per dosage unit.

The pharmaceutical carrier employed in the composition can be either a solid or liquid. Exemplary of solid carriers are lactose, magnesium stearate, terra alba, sucrose, talc, stearic acid, gelatin, agar pectin or acacia. Exemplary of liquid carriers are peanut oil, olive oil, sesame oil and water. Similarly the carrier or diluent may include a time delay material such as glyceryl monostearate or glyceryl distearate alone or with a wax.

A wide variety of pharmaceutical forms can be employed and are prepared by methods well known to the art. Thus if a solid carrier is used the composition can be tabletted, used as a pharmaceutical powder, placed in a hard gelatin capsule or in the form of a troche or lozenge. If a liquid carrier is used the composition can be in the form of a soft gelatin capsule or a liquid suspension. Parenteral dosage forms are obtained by dissolving a water-soluble salt of the pyridine compound in water or saline solution in a concentration such that 1 cc. of the solution contains from about 10 mg. to about 25 mg. of pyridine compound. The solution can then be filled into single or multiple dose ampules.

Included in this invention is the method of producing hypotension which comprises internally administering to animals a 2,6-diamino-4-substituted-pyridine of Formula I or a corresponding N-oxide, or a nontoxic organic or inorganic acid addition salt thereof, preferably in a pharmaceutical composition such as described above, in an amount sufficient to produce hypotension. The pyridine compound in dosage units as described above is administered orally or parenterally in repeated doses. The daily dosage is from about 20 mg. to about 1000 mg. of pyridine compound, advantageously from about 40 mg. to about 600 mg. When the method described above is carried out, effective hypotension is produced.

The 2,6-diamino-4-lower-alkoxypyridines of this invention are prepared according to the following general sequence of reactions: chelidamic acid is treated first with phosphorus pentachloride and then methanol to give 2,6-biscarbomethoxy-4-chloropyridine; the 4-chloro compound is reacted with an alkali metal lower alkoxide to give the corresponding 4-lower alkoxy derivative; the bis-carbomethoxy compound is reacted with hydrazine hydrate solution to give 2,6-bishydrazido-4-lower-alkoxypyridine; the bishydrazide is rearranged under Curtius reaction conditions with aqueous sodium nitrite to give upon hydrolysis of the intermediate acid azide with ethanol, the bis urethane which is hydrolyzed with alkali to give the 2,6-diamino-4-lower-alkoxypyridine.

Alternatively the 2,6-diamino-4-substituted pyridines of this invention, and preferably the 4-phenoxy derivatives, are prepared according to the following general sequence of reactions: 2,6-biscarbomethoxy-4-chloropyridine is treated with ammonia to give 2,6-biscarboxamido-4-chloropyridine; the bis amide is reacted with an alkali metal alkoxide or phenoxide to give the corresponding 4-alkoxide or 4-phenoxide derivative; and this bis amide is converted to the diamino product by treatment with potassium hypobromite.

The N-oxide derivatives of this invention are prepared from the diamino products by first acetylating to the bisacetamido derivative and oxidation of the latter with peracetic acid followed by basic hydrolysis to give the 2,6-diamino-4-substituted-pyridine-N-oxide.

The 2,4-diamino-4-n-propoxy, -isopropoxy, -n-butoxy, -n-pentoxy, -isopentoxy and n-hexyloxypyridines have been described by Markees, Dewey and Kidder, Arch. Biochem. and Biophys. 86, 179–184 (1960); Chem. Abstr. 54, 16669a (1960). The 2,4-diamino-4-phenoxypyridine has been described by Markees, Dewey and Kidder, Abstracts 141st American Chemical Society Meeting, p. 3N, Mar. 26–29 1962.

The following examples are not limiting but illustrate the preparation of 2,6-diamino-4-substituted pyridines, corresponding N-oxides and specific pharmaceutical compositions of this invention.

Example 1

A mixture of 61.0 g. of chelidamic acid, 209.5 g. of phosphorus pentachloride and 300 ml. of carbon tetrachloride is refluxed until evolution of hydrogen chloride ceases. To the solution thus obtained is added 250 ml. of methanol, dropwise under gentle reflux. The solution is refluxed until evolution of hydrogen chloride ceases and then the solvents are removed by distillation. The residue is poured onto about 1 l. of ice-water mixture. The solid is recrystallized from methanol to give 2,6-biscarbomethoxy-4-chloropyridine, M.P. 143–144° C.

A suspension of 21.7 g. of the above 4-chloropyridine in 50 ml. of butanol is brought to reflux and added to a solution of 2.4 g. of sodium in 50 ml. of butanol. The reaction mixture is refluxed for two hours and the butanol removed in vacuo. Water is added to the residue and the mixture extracted with ether. The dried extract is evaporated to give an oil, 2,6-biscarbomethoxy-4-butoxypyridine.

A solution of 12 ml. of 85% hydrazine hydrate in 30 ml. of ethanol is added to a solution of the above 4-butoxypyridine (23.3 g.) in 100 ml. of ethanol. The mixture is refluxed for one hour, cooled and the precipitate recrystallized from water to give the 2,6-bishydrazido-4-butoxypyridne, M.P. 223–228° C.

An aqueous solution of 5.1 g. of sodium nitrite is added to a suspension of the above bishydrazide (8.8 g.) in 200 ml. of 8% hydrochloric acid, maintaining the temperature between 5–10° C. The intermediate 4-butoxypyridine-2,6-dicarboxylic acid diazide is taken up in ether and to the dried solution is added 250 ml. of absolute alcohol. The ether is removed by distillation and the remaining alcoholic solution is refluxed for five hours. The volume is reduced to about 50 ml. and water is added to turbidity. The solid ethyl urethane (ca. 2.5 g.) and 2.5 g. of potassium hydroxide in 50 ml. of absolute ethanol is refluxed for 20 hours. The volume of the reaction mixture is reduced and water is added to precipitate the product, 4-butoxy-2,6-diaminopyridine, M.P. 146.5–147° C.

Example 2

Ammonia gas is passed into a stirred suspension of 22.9 g. of 2,6-biscarbomethoxy-4-chloropyridine in 200 ml. of methanol, with cooling. After about 30 minutes the mixture is stirred for one hour at room temperature. The addition of ammonia is stopped and stirring continued for one hour at room temperature. Filtration gives 2,6-biscarboxamido-4-chloropyridine, M.P. above 300° C.

A mixture of 13.9 g. of sodium hydroxide and 173 g. of phenol is stirred and heated to 140° C., cooled slightly and diluted with 434 ml. of dimethylformamide. The temperature is increased again and 110 ml. of solvent is distilled off. The mixture is cooled slightly, 52 g. of the above biscarboxamide is added and then refluxed for three hours. After standing at room temperature overnight, the reaction mixture is diluted with water, filtered and the solid washed with water and ether. Recrystallization yields 2,6-biscarboxamido-4-phenoxypyridine, M.P. 256–257° C.

To a solution of 95.5 g. of 85% potassium hydroxide in 570 ml. of water at 0° C. is added 17.4 ml. of bromine, dropwise. To this solution is added all at once 32 g. of the above 4-phenoxypyridine. After stirring at 0° C. for about 90 minutes, the resulting solution is rapidly heated to 75–80° C for 15 minutes. Charcoal is added, the mixture cooled and filtered. The filtrate is acidified to pH 5 with glacial acetic acid, then made basic and filtered to give 2,6-diamino-4-phenoxypyridine which after purification melts at 191.5–194.5° C.

Example 3

Acetic anhydride (75 ml.) is added to 11 g. of 2,6-diamino-4-phenoxypyridine and the solution allowed to stand at room temperature overnight. Excess anhydride is decomposed by the addition of 75 ml. of methanol and the mixture is evaporated in vacuo. The residue is triturated with water and then recrystallized from ethyl acetate petroleum ether to give 2,6-bisacetamido-4-phenoxypyridine, M.P. 174–177° C.

To a stirred solution of 14.5 g. of the above bisacetamido pyridine in 500 ml. of chloroform is added 28.5 g. of 40% peracetic acid and the mixture is refluxed for eight hours with stirring. The cooled reaction mixture is poured into about 400 ml. of ice-water, made basic to pH 9 with 40% sodium hydroxide solution and the chloroform layer is separated. The aqueous solution is extracted with chloroform and the combined extract is dried and evaporated. The residue is taken up in warm ethanol, the solution filtered, cooled and water added to precipitate 2,6 - bisacetamido-4-phenoxypyridine-N-oxide, M.P. 205–210° C.

A mixture of 1.5 g. of the above pyridine-N-oxide in 15 ml. of 10% sodium hydroxide solution is refluxed for eight hours with stirring. The reaction mixture is cooled to give the product 2,6-diamino-4-phenoxypyridine-N-oxide, M.P. 236–237° C.

Example 4

A mixture of 3.2 g. of sodium hydroxide and 35 ml. of o-chlorophenol is heated in an oil bath at 140° C. with stirring until solution is complete. Dimethylformamide (100 ml.) is added and then 20 ml. of solvent is distilled off to remove traces of water. To this is added 12 g. of 2,6-biscarboxamido-4-chloropyridine and the mixture is refluxed with stirring for five hours. The reaction mixture is cooled, diluted with water and ether and filtered to give 2,6 - biscarboxamido-4-(2-chlorophenoxy)-pyridine, M.P. 262–264° C.

To a stirred solution of 95.6 g. of potassium hydroxide in 600 ml. of water is added 17.4 ml. of bromine, dropwise, at 2° C. and then 36.2 g. of the above 2-chlorophenoxy pyridine. The reaction mixture is stirred for 45 minutes at 0° C. and then heated rapidly to 75–80° C. After 15 minutes at this temperature, the reaction mixture is cooled, filtered and the filtrate is treated with glacial acetic acid to pH 5. The gummy material is extracted with boiling water and the cooled aqueous mixture is made basic with 40% sodium hydroxide solution. The precipitate is sublimed in vacuo at 150° C. to give 2,6-diamino-4-(2-chlorophenoxy)-pyridine, M.P. 153–155° C.

Similarly an equivalent amount of o-bromophenol is converted to its sodium salt and reacted with 12 g. of 2,6-biscarboxamido-4-chloropyridine to give 2,6-discarboxamido-4-(2-bromophenoxy)-pyridine which is treated with potassium hypobromite to yield the corresponding 2,6-diamino-4-(2-bromophenoxy)-pyridine.

Example 5

A mixture of 3.2 g. of sodium hydroxide and 25 ml. of m-chlorophenol is heated in an oil bath at 140° C. with stirring until solution is complete. Dimethylformamide (150 ml.) is added and then 15 ml. of solvent is distilled off. To the solution is added 12 g. of 2,6-bis-carboxamido-4-chloropyridine and the mixture is refluxed for five and one-half hours with stirring. The cooled reaction mixture is diluted with water and the resulting precipitate recrystallized from ethanol to give 2,6-bis-carboxamido-4-(3-chlorophenoxy)-pyridine, M.P. 268–270° C.

To a stirred solution of 47.8 g. of potassium hydroxide in 285 ml. of water is added 8.7 ml. of bromine, dropwise, at 0° C. and then 18.1 g. of the above 3-chlorophenoxy pyridine. The mixture is stirred for 30 minutes at 0° C. and then heated rapidly to 75–80° C. for 15 minutes. The reaction mixture is cooled, filtered, acidified to pH 4 with glacial acetic acid and then made basic with 10% sodium hydroxide solution. The resulting solid is recrystallized from toluene to give 2,6-diamino-4-(3-chlorophenoxy)-pyridine, M.P. 154–156° C.

Similarly an equivalent amount of o-fluorophenol is converted to its sodium salt and reacted with 12 g. of 2,6-biscarboxamido-4-chloropyridine to give 2,6-biscarboxamido-4-(2-fluorophenoxy)-pyridine which is treated with potassium hypobromite to yield the corresponding 2,6-diamino-4-(2-fluorophenoxy)-pyridine.

*Example 6*

Following the procedures of Examples 4 and 5, the sodium salt of p-chlorophenol and 12 g. of 2,6-bis-carboxamido-4-chloropyridine are reacted to give 2,6-bis-carboxamido-4-(4-chlorophenoxy)-pyridine, M.P. 299–304° C., which is converted similarly with potassium hypobromite to yield the corresponding 2,6-diamino-4-(4-chlorophenoxy)-pyridine, M.P. 139–140° C.

*Example 7*

A mixture of 3.2 g. of sodium hydroxide and 25 ml. of o-cresol is heated in an oil bath at 140° C. with stirring until solution takes place. Dimethylformamide (100 ml.) is added and 15 ml. of solvent is distilled off. To the solution is added 12 g. of 2,6-biscarboxamido-4-chloropyridine and the mixture refluxed with stirring for five hours. The cooled reaction mixture is diluted with water and ether. The resulting precipitate is recrystallized to give 2,6 - biscarboxamido-4-(2-methylphenoxy)-pyridine, M.P. 256–259° C.

To a stirred solution of 47.8 g. of potassium hydroxide in 300 ml. of water is added 8.7 ml. of bromine, dropwise, at 2° C. and then 16.8 g. of 2,6-biscarboxamido-4-(2-methylphenoxy)-pyridine. The mixture is stirred for 45 minutes at 0° C. and then heated rapidly to 75–80° C. for 15 minutes. The cooled reaction mixture is filtered and the filtrate treated with glacial acetic acid to pH 4.5. The precipitate is extracted with boiling water and the cooled extract is made basic with 40% sodium hydroxide solution. The resulting solid is recrystallized from toluene to give 2,6-diamino-4-(2-methylphenoxy)-pyridine, M.P. 155–157° C.

Similarly, using equivalent amounts of reactants and substituting 25 ml. of m-cresol or p-cresol the corresponding products are prepared: 2,6-diamino-4-(3-methylphenoxy)-pyridine, M.P. 132–133° C. and 2,6-diamino-4-(4-methylphenoxy)-pyridine, M.P. 173–175° C., respectively.

*Example 8*

Following the procedures of Examples 4 and 5, the sodium salt of 2,6-dimethylphenol and 12 g. of 2,6-bis-carboxamido-4-chloropyridine are reacted to give 2,6-biscarboxamido - 4-(2,6-dimethylphenoxy)-pyridine, M.P. 304–307° C., which is similarly treated with potassium hypobromite to yield 2,6-diamino - 4-(2,6-dimethylphenoxy)-pyridine, M.P. 162–165° C.

Similarly the sodium salt of 2-ethylphenol and 12 g. of 2,6-biscarboxamido-4-chloropyridine are reacted to give 2,6-biscarboxamido-4-(2-ethylphenoxy)-pyridine which is treated with potassium hypobromite to yield 2,6-diamino-4-(2-ethylphenoxy)-pyridine.

*Example 9*

A mixture of 3.2 g. of sodium hydroxide and 25 ml. of o-methoxyphenol is heated in an oil bath at 140° C. with stirring until solution is complete and then 100 ml. of dimethylformamide is added. Fifteen milliliters of solvent is distilled off and 12 g. of 2,6-biscarboxamido-4-chloropyridine is added. The mixture is refluxed for five hours with stirring, then cooled and diluted with water. The precipitate is recrystallized to give 2,6-biscarboxamido-4-(2-methoxyphenoxy)-pyridine, M.P. 248–252° C.

To a stirred solution of 47.8 g. of potassium hydroxide in 300 ml. of water is added 8.7 ml. of bromine, dropwise, at 0–2° C. and then 17.8 g. of the above 2-methoxyphenoxy pyridine. The mixture is stirred for 45 minutes at 0° C., 300 ml. of water is added and the mixture subsequently heated rapidly to 75–80° C. for 15 minutes. The cooled reaction mixture is filtered and treated with glacial acetic acid to pH 4. The precipitate is filtered off, the filtrate made basic with 40% sodium hydroxide solution and then extracted with ethyl acetate. The precipitate is extracted with boiling water, the extract cooled, similarly made basic and extracted with ethyl acetate. The combined ethyl acetate extracts are dried and evaporated to give a residue which is suspended in ethyl acetate and precipitated with hexane to give 2,6-diamino-4-(2-methoxyphenoxy)-pyridine, M.P. 162–163° C.

Similarly, using equivalent amounts of reactants and substituting 25 ml. of m-methoxyphenol or p-methoxyphenol the corresponding products are prepared: 2,6-diamino-4-(3-methoxyphenoxy)-pyridine, M.P. 100–101° C. and 2,6-diamino-4-(4-methoxyphenoxy)-pyridine, M.P. 185–188° C., respectively.

*Example 10*

Following the procedures of Examples 4 and 5, the sodium salt of 2,6-dimethoxyphenol and 12 g. of 2,6-biscarboxamido-4-chloropyridine are reacted to give 2,6-biscarboxamido-4-(2,6-dimethoxyphenoxy)-pyridine, M.P. 278–280° C., which is treated with potassium hypobromite to yield 2,6-diamino-4-(2,6-dimethoxyphenoxy)-pyridine, M.P. 245–248° C.

Similarly the sodium salt of 4-propoxyphenol and 12 g. of 2,6-biscarboxamido-4-chloropyridine are reacted to give 2,6-biscarboxamido-4-(4 - propoxyphenoxy)-pyridine which is treated with potassium hypobromite to yield 2,6-diamino-4-(4-propoxyphenoxy)-pyridine.

*Example 11*

To a stirred solution of 16.1 g. of sodium in 300 ml. of 2-methylbutanol-1 is added 99.8 g. of 2,6-biscarboxamido-4-chloropyridine and 800 ml. of dimethylformamide. The mixture is refluxed for five and one-half hours with stirring, cooled and diluted with water. The precipitate is recrystallized to give 2,6-biscarboxamido-4-(2-methylbutoxy)-pyridine, M.P. 226–230° C.

To a stirred solution of 47.8 g. of potassium hydroxide in 300 ml. of water is added 8.7 ml. of bromine, dropwise, at 2° C. and then 15.6 g. of the above biscarboxamide. The mixture is stirred one and one-half hours at 0° C., filtered and the filtrate heated to 50° C. for five minutes. The cooled reaction mixture is treated with glacial acetic acid to pH 5 and then made basic with 40% sodium hydroxide solution. The precipitate is purified by sublimation to give 2,6-diamino-4-(2-methylbutoxy)-pyridine, M.P. 140–143° C.

Similarly, by employing 3-methylbutanol-1 in the above reaction sequence there is obtained the corresponding 2,6-diamino-4-(3-methylbutoxy)-pyridine, M.P. 134–135° C.

*Example 12*

To 60 ml. of acetic anhydride is added 10 g. of 2,6-diamino-4-butoxypyridine and the mixture is allowed to stand overnight at room temperature. Methanol (60 ml.) is added to destroy excess anhydride and then the solvents are removed in vacuo. The residue is triturated with water to give after recrystallization 2,6-bisacetamido-4-butoxypyridine, M. P. 93–95° C.

To a stirred solution of 23.6 g. of the above butoxypyridine in 300 ml. of chloroform is added 45 g. of 40% peracetic acid and the mixture is refluxed for six hours. The reaction mixture is poured onto about 500 ml. of ice-water, made basic with 40% sodium hydroxide solution and the organic layer is separated. The basic layer is extracted with chloroform and the dried extract is evaporated. The residue is triturated with hexane and recrystallized to give 2,6-bisacetamido-4-butoxypyridine-N-oxide, M.P. 145–146° C.

A mixture of 11.9 g. of the above N-oxide in 100 ml. of 10% sodium hydroxide solution is refluxed for seven and one-half hours with stirring. Cooling gives the product, 2,6-diamino-4-butoxypyridine-N-oxide, M. P. 215–218° C.

Similarly, 2,6-bisacetamido-4-(2-methylphenoxy)-pyridine is prepared from the corresponding 2,6-diaminopyridine and acetic anhydride and is treated with 40% peracetic acid to give the analogous N-oxide which is subsequently hydrolyzed in 10% sodium hydroxide solution to the product, 2,6-diamino-4-(2-methylphenoxy)-pyridine-N-oxide, M.P. 172–173° C.

Example 13

A mixture of 200 g. of chelidamic acid in 1 l. of propanol and 50 ml. of concentrated sulfuric acid is refluxed for 18 hours with stirring. The cooled reaction mixture is filtered and the filtrate evaporated in vacuo. The residue is dissolved in dioxane, filtered and then diluted with water. An oil separates which is extracted with ether. The dried ether extract is evaporated to give 2,6-biscarbopropoxy-4-hydroxypyridine, as an oil.

The above propyl ester (157.4 g.) is refluxed with 300 ml. of thionyl chloride for two and one-half hours. The reaction mixture is evaporated in vacuo almost to dryness and the residue is poured into ice-water. This is extracted with ether and the dried extract evaporated to give 2,6-biscarbopropoxy-4-chloropyridine, as an oil.

Following the general procedure of Example 1, a solution of 151.0 g. of the above 4-chloropyridine in 250 ml. of propanol is added to a solution of 13.8 g. of sodium in 300 ml. of propanol and the mixture refluxed for one hour to give an oil, 2,6-biscarbopropoxy-4-propoxypyridine.

A mixture of 79.6 g. of the above 4-propoxypyridine in 400 ml. of ethanol and 48 ml. of 85% hydrazine hydrate is refluxed for two hours to give the 2,6-bishydrazido-4-propoxypyridine, M.P. 221–227° C.

A solution of 34.5 g. of sodium nitrite in 200 ml. of water is added a solution of 60.9 g. of the above bishydrazide in a mixture of 450 ml. of 3 N hydrochloric acid and 225 ml. of dimethylformamide, at 5–10° C. The intermediate diazide is refluxed in ethanol for six hours and the resulting ethyl urethane is hydrolyzed with 41.1 g. of potassium hydroxide in 900 ml. of absolute ethanol at reflux temperature for 19 hours to yield the product, 2,6-diamino-4-propoxypyridine, M.P. 143–145° C.

Example 14

Following the procedures of Examples 4 and 5, the sodium salt of 3,4-dichlorophenol and 12 g. of 2,6-biscarboxamido-4-chloropyridine are reacted to give 2,6-biscarboxamido-4-(3,4-dichlorophenoxy)-pyridine which is treated with potassium hypobromite to yield 2,6-diamino-4-(3,4-dichlorophenoxy)-pyridine.

Example 15

Following the general reaction procedure outlined in Example 2, equivalent amounts of n-pentanol and n-octanol, converted to their sodium salts, are reacted with 52 g. of 2,6-biscarboxamido-4-chloropyridine to give the respective 2,6-biscarboxamido-4-(n-pentoxy)- and 4-(n-octyloxy)-pyridine which are treated with potassium hypobromite to give 2,6-diamino-4-(n-pentoxy)-pyridine and 2,6-diamino-4-(n-octyloxy)-pyridine, respectively.

Similarly an equivalent amount of 3-trifluoromethylphenol is converted to its sodium salt and reacted with 52 g. of 2,6-biscarboxamido-4-chloropyridine to give 2,6-biscarboxamido-4-(3-trifluoromethylphenoxy)-pyridine which is treated with potassium hypobromite to yield 2,6-diamino-4-(3-trifluoromethylphenoxy)-pyridine.

Example 16

Various strength capsules are prepared containing 4-butoxy-2,6-diaminopyridine either as the free base or an equivalent amount of a nontoxic pharmaceutically acceptable acid addition salt thereof from the following ingredients:

| Medicament, mg. | Magnesium Stearate, mg. | Lactose, mg. |
|---|---|---|
| 10 | 2 | 260 |
| 25 | 2 | 250 |
| 50 | 3 | 150 |
| 100 | 3 | 100 |

The above ingredients are screened through a #40 U.S. mesh screen, mixed and filled into hard gelatin capsules.

What is claimed is:

1. A pharmaceutical composition for internal administration and the lowering of blood pressure in dosage unit form, comprising a pharmaceutical carrier and from about 10 mg. to about 250 mg. of a compound selected from the group consisting of a 2,6-diamino-4-substituted-pyridine, a corresponding N-oxide thereof and nontoxic pharmaceutically acceptable acid addition salts thereof, said 4-substituted pyridine having the following formula:

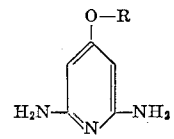

in which R is a member selected from the group consisting of lower alkyl of from 3 to 8 carbon atoms, phenyl, mono lower alkyl substituted phenyl, mono lower alkoxy substituted phenyl, mono chloro substituted phenyl, mono bromo substituted phenyl, mono fluoro substituted phenyl and mono trifluoromethyl substituted phenyl.

2. A pharmaceutical composition for internal administration and the lowering of blood pressure in dosage unit form, comprising a pharmaceutical carrier and from about 10 mg. to about 150 mg. of a compound selected from the group consisting of a 2,6-diamino-4-substituted-pyridine, a corresponding N-oxide thereof and nontoxic pharmaceutically acceptable acid addition salts thereof, said 4-substituted pyridine having the following formula:

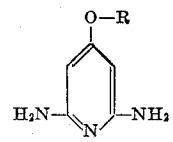

in which R is a member selected from the group consisting of lower alkyl of from 3 to 8 carbon atoms, phenyl, mono lower alkyl substituted phenyl, mono lower alkoxy substituted phenyl, mono chloro substituted phenyl, mono bromo substituted phenyl, mono fluoro substituted phenyl and mono trifluoromethyl substituted phenyl.

3. A pharmaceutical composition for internal administration and the lowering of blood pressure, in dosage unit form, comprising a pharmaceutical carrier and from about 10 mg. to about 150 mg. of a compound selected from the group consisting of 4-(n-butoxy)-2,6-diaminopyridine and a nontoxic pharmaceutically acceptable acid addition salt thereof.

4. A method of producing hypotension which comprises internally administering to animals an effective amount of a compound selected from the group consisting of a 2,6-diamino-4-substituted-pyridine, a corresponding N-oxide thereof and nontoxic pharmaceutically acceptable acid addition salts thereof, said 4-substituted pyridine having the following formula:

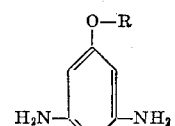

in which R is a member selected from the group consisting of lower alkyl of from 3 to 8 carbon atoms, phenyl, mono lower alkyl substituted phenyl, mono lower alkoxy substituted phenyl, mono chloro substituted phenyl, mono bromo substituted phenyl, mono fluoro substituted phenyl and mono trifluoromethyl substituted phenyl.

5. The method in accordance with claim 4 in which 4-(n-butoxy)-2,6-diaminopyridine is administered.

6. A method of producing hypotension which comprises internally administering to animals a daily dosage of from about 20 mg. to about 1000 mg. of a compound selected from the group consisting of a 2,6-diamino-4-substituted-pyridine, a corresponding N-oxide thereof and nontoxic pharmaceutically acceptable acid addition salts thereof, said 4-substituted pyridine having the following formula:

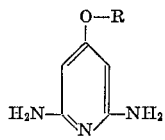

in which R is a member selected from the group consisting of lower alkyl of from 3 to 8 carbon atoms, phenyl mono lower alkyl substituted phenyl, mono lower alkoxy substituted phenyl, mono chloro substituted phenyl, mono bromo substituted phenyl, mono fluoro substituted phenyl and mono trifluoromethyl substituted phenyl.

7. A method of producing hypotension which comprises internally administering to animals a daily dosage of from about 40 mg. to about 600 mg. of a compound selected from the group consisting of a 2,6-diamino-4-substituted-pyridine, a corresponding N-oxide thereof and nontoxic pharmaceutically acceptable acid addition salts thereof, said 4-substituted pyridine having the following formula:

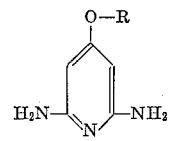

in which R is a member selected from the group consisting of lower alkyl of from 3 to 8 carbon atoms, phenyl, mono lower alkyl substituted phenyl, mono lower alkoxy substituted phenyl, mono chloro substituted phenyl, mono bromo substituted phenyl, mono fluoro substituted phenyl and mono trifluoromethyl substituted phenyl.

8. A method of producing hypotension which comprises internally administering to animals a daily dosage of from about 20 mg. to about 600 mg. of a compound selected from the group consisting of 4-(n-butoxy)-2,6-diaminopyridine and a nontoxic pharmaceutically acceptable acid addition salt thereof.

9. A pharmaceutical composition in accordance with claim 3 in which the dosage unit form is a tablet.

10. A pharmaceutical composition in accordance with claim 3 in which the dosage unit form is a capsule.

References Cited

Markees et al.: Archives of Biochemistry and Biophysics, vol. 86, pp. 179–184, 1960.

Markees et al.: Abstracts 141st American Chemical Society Meeting, p. 3N, Mar. 26–29, 1962.

ALBERT T. MEYERS, *Primary Examiner.*

LEROY B. RANDALL, *Assistant Examiner.*